(12) United States Patent
Swaminathan

(10) Patent No.: US 11,201,946 B1
(45) Date of Patent: Dec. 14, 2021

(54) SYSTEMS AND METHODS FOR DIGITAL MEDIA DELIVERY PRIORITIZATION

(71) Applicant: Facebook, Inc., Menlo Park, CA (US)

(72) Inventor: Arvind Swaminathan, San Jose, CA (US)

(73) Assignee: Facebook, Inc., Menlo Park, CA (US)

(*) Notice: Subject to any disclaimer, the term of this patent is extended or adjusted under 35 U.S.C. 154(b) by 25 days.

(21) Appl. No.: 16/237,374

(22) Filed: Dec. 31, 2018

(51) Int. Cl.
*H04L 29/08* (2006.01)
*G06Q 50/00* (2012.01)

(52) U.S. Cl.
CPC ........ *H04L 67/322* (2013.01); *H04L 67/2847* (2013.01); *H04L 67/327* (2013.01); *G06Q 50/01* (2013.01)

(58) Field of Classification Search
CPC . H04L 67/322; H04L 67/2847; H04L 67/327; G06Q 50/01
USPC .......................................................... 709/232
See application file for complete search history.

(56) References Cited

U.S. PATENT DOCUMENTS

| | | | | |
|---|---|---|---|---|
| 7,797,369 B2* | 9/2010 | Glickman | ............ | H04N 1/3333 709/201 |
| 8,438,181 B2 | 5/2013 | Read | | |
| 8,762,879 B1* | 6/2014 | Goodger | ............... | G06F 16/957 715/777 |
| 8,769,548 B2* | 7/2014 | Piira | ....................... | G06F 1/329 719/310 |
| 8,904,033 B2* | 12/2014 | Kekki | .................. | G11B 27/105 709/234 |
| 9,009,373 B2 | 4/2015 | Li | | |
| 9,213,775 B2* | 12/2015 | Tseng | .................. | G06F 16/9562 |
| 9,652,112 B2* | 5/2017 | Steiner | .................... | H04L 65/60 |
| 9,971,791 B2 | 5/2018 | Yadav et al. | | |
| 10,084,882 B2* | 9/2018 | Bellessort | ............. | G06F 9/5027 |
| 10,346,019 B2* | 7/2019 | Migos | ................... | G06F 3/0485 |
| 10,505,883 B1 | 12/2019 | Jain et al. | | |
| 2002/0178232 A1 | 11/2002 | Ferguson | | |
| 2003/0009505 A1 | 1/2003 | Cuomo et al. | | |
| 2003/0220984 A1 | 11/2003 | Jones et al. | | |
| 2006/0020973 A1* | 1/2006 | Hannum | ............ | H04N 5/44543 725/46 |
| 2007/0168543 A1* | 7/2007 | Krikorian | ............ | G11B 27/034 709/231 |
| 2014/0074910 A1* | 3/2014 | Tai | ........................ | H04L 67/32 709/203 |
| 2014/0122682 A1 | 5/2014 | Falkenberg et al. | | |
| 2014/0215071 A1 | 7/2014 | Lee et al. | | |

(Continued)

*Primary Examiner* — David P Zarka
(74) *Attorney, Agent, or Firm* — Sheppard Mullin Richter & Hampton LLP

(57) ABSTRACT

Systems, methods, and non-transitory computer-readable media can establish a plurality of connections to a server, wherein each connection is associated with a respective content item of a plurality of content items. A plurality of data requests are transmitted to the server using the plurality of connections, wherein each data request is associated with one content item of the plurality of content items. Processing of data received on a first connection of the plurality of connections is delayed, the first connection being associated with a first data request of the plurality of data requests and a first content item of the plurality of content items, in order to cause the server to pause data transmissions responsive to the first data request.

20 Claims, 8 Drawing Sheets

(56) References Cited

U.S. PATENT DOCUMENTS

| | | | |
|---|---|---|---|
| 2015/0205462 A1* | 7/2015 | Jitkoff | G06F 16/955 |
| | | | 715/777 |
| 2018/0146263 A1* | 5/2018 | Doherty | H04N 21/26258 |
| 2018/0160193 A1 | 6/2018 | Yoo et al. | |
| 2018/0285148 A1* | 10/2018 | Dutton | G06F 9/4843 |
| 2019/0205169 A1 | 7/2019 | Lee et al. | |
| 2019/0250593 A1 | 8/2019 | Mizumoto et al. | |

* cited by examiner

400

Receive a plurality of data requests transmitted by a client device, wherein each data request is associated with priority information indicative of a priority level of the data request
402

Identify a first data request of the plurality of data requests as a high priority data request based on priority information associated with the first data request and a second data request of the plurality of data requests as a low priority data request based on priority information associated with the second data request
404

Process the first data request before processing the second data request based on identifying the first data request as a high priority data request and identifying the second data request as a low priority data request
406

```
┌─────────────────────────────────────────────────────────────────────────────┐
│ Establish a plurality of connections to a server, wherein each connection is associated with │
│              a respective content item of a plurality of content items       │
│                                     502                                      │
└─────────────────────────────────────────────────────────────────────────────┘
                                        │
                                        ▼
┌─────────────────────────────────────────────────────────────────────────────┐
│    Transmit a plurality of data requests to the server using the plurality of connections,   │
│   wherein each data request is associated with one content item of the plurality of content  │
│                                     items                                    │
│                                     504                                      │
└─────────────────────────────────────────────────────────────────────────────┘
                                        │
                                        ▼
┌─────────────────────────────────────────────────────────────────────────────┐
│  Delay processing of data received on a first connection of the plurality of connections, the │
│   first connection being associated with a first data request of the plurality of data requests │
│    and a first content item of the plurality of content items, in order to cause the server to │
│              pause data transmissions responsive to the first data request   │
│                                     506                                      │
└─────────────────────────────────────────────────────────────────────────────┘
```

FIGURE 5

SYSTEMS AND METHODS FOR DIGITAL MEDIA DELIVERY PRIORITIZATION

FIELD OF THE INVENTION

The present technology relates to the field of digital data transmission. More particularly, the present technology relates to techniques for prioritization of digital media delivery.

BACKGROUND

Today, people often utilize computing devices (or systems) for a wide variety of purposes. Users can use their computing devices to, for example, interact with one another, access content, share content, and create content. In some cases, content items can include postings from members of a social networking system. The postings may include text and media content items, such as images, videos, and audio. The postings may be published to the social networking system for consumption by others.

SUMMARY

Various embodiments of the present technology can include systems, methods, and non-transitory computer readable media configured to receive a plurality of data requests transmitted by a client device, wherein each data request is associated with priority information indicative of a priority level of the data request. A first data request of the plurality of data requests is identified as a high priority data request based on priority information associated with the first data request, and a second data request of the plurality of data requests is identified as a low priority data request based on priority information associated with the second data request. The first data request is processed before the second data request based on identifying the first data request as a high priority data request and identifying the second data request as a low priority data request.

In an embodiment, each data request of the plurality of data requests identifies a content item being requested by the client device.

In an embodiment, the first data request identifies an on-screen content item being presented on the client device.

In an embodiment, the second data request identifies an off-screen content item being prefetched.

In an embodiment, each data request of the plurality of data requests identifies a portion of the content item being requested by the client device.

In an embodiment, the portion of the content item is defined by a range of bytes.

In an embodiment, the processing the first data request before processing the second data request comprises: transmitting, to the client device, a first set of data responsive to the first data request, and transmitting, to the client device, a second set of data responsive to the second data request after the transmitting the first set of data is completed.

In an embodiment, the transmitting the second set of data is performed based on a determination that processing of all pending high priority data requests for the client device have been completed.

In an embodiment, the processing the first data request before processing the second data request comprises: transmitting, to the client device, a first set of data responsive to the first data request, transmitting, to the client device, a portion of a second set of data responsive to the second data request after the transmitting the first set of data is completed, during transmission of the second set of data to the client device, receiving a third data request from the client device, wherein the third data request is identified as a high priority data request, and in response to the receiving the third data request from the client device, ceasing transmission of the second set of data to the client device, and transmitting, to the client device, a third set of data responsive to the third data request.

In an embodiment, transmission of the second set of data to the client device is resumed after completion of the transmitting the third set of data.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Various embodiments of the present technology can include systems, methods, and non-transitory computer readable media configured to establish a plurality of connections to a server, wherein each connection is associated with a respective content item of a plurality of content items. A plurality of data requests are transmitted to the server using the plurality of connections, wherein each data request is associated with one content item of the plurality of content items. Processing of data received on a first connection of the plurality of connections is delayed, the first connection being associated with a first data request of the plurality of data requests and a first content item of the plurality of content items, in order to cause the server to pause data transmissions responsive to the first data request.

In an embodiment, processing of data received on a second connection of the plurality of connections is maintained, the second connection being associated with a second data request of the plurality of data requests and a second content item of the plurality of content items, in order to cause the server to continue data transmissions responsive to the second data request.

In an embodiment, the first content item is identified as a low priority content item and the second content item is identified as a high priority content item.

In an embodiment, the second content item is an on-screen content item being presented to a user.

In an embodiment, the first content item is an off-screen content item being prefetched.

In an embodiment, processing of data received on all connections of the plurality of connections is delayed, except for the second connection, in order to cause the server to pause data transmissions on all connections except for the second connection, and to expediate data transmissions associated with the second content item.

In an embodiment, processing of data receive on a subset of the plurality of connections is selectively delayed in order to cause the server to pause data transmissions pertaining to prefetching of content items.

In an embodiment, processing of data received on the first connection is resumed in order to cause the server to resume transmissions responsive to the first data request.

In an embodiment, a plurality of data transmissions responsive to the plurality of data requests are received via the plurality of connections.

In an embodiment, content is presented to a user based on the plurality of data transmissions responsive to the plurality of data requests.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 4 illustrates an example method associated with server-side data prioritization, according to an embodiment of the present technology.

FIG. 5 illustrates an example method associated with client-side data prioritization, according to an embodiment of the present technology.

Figure 1:
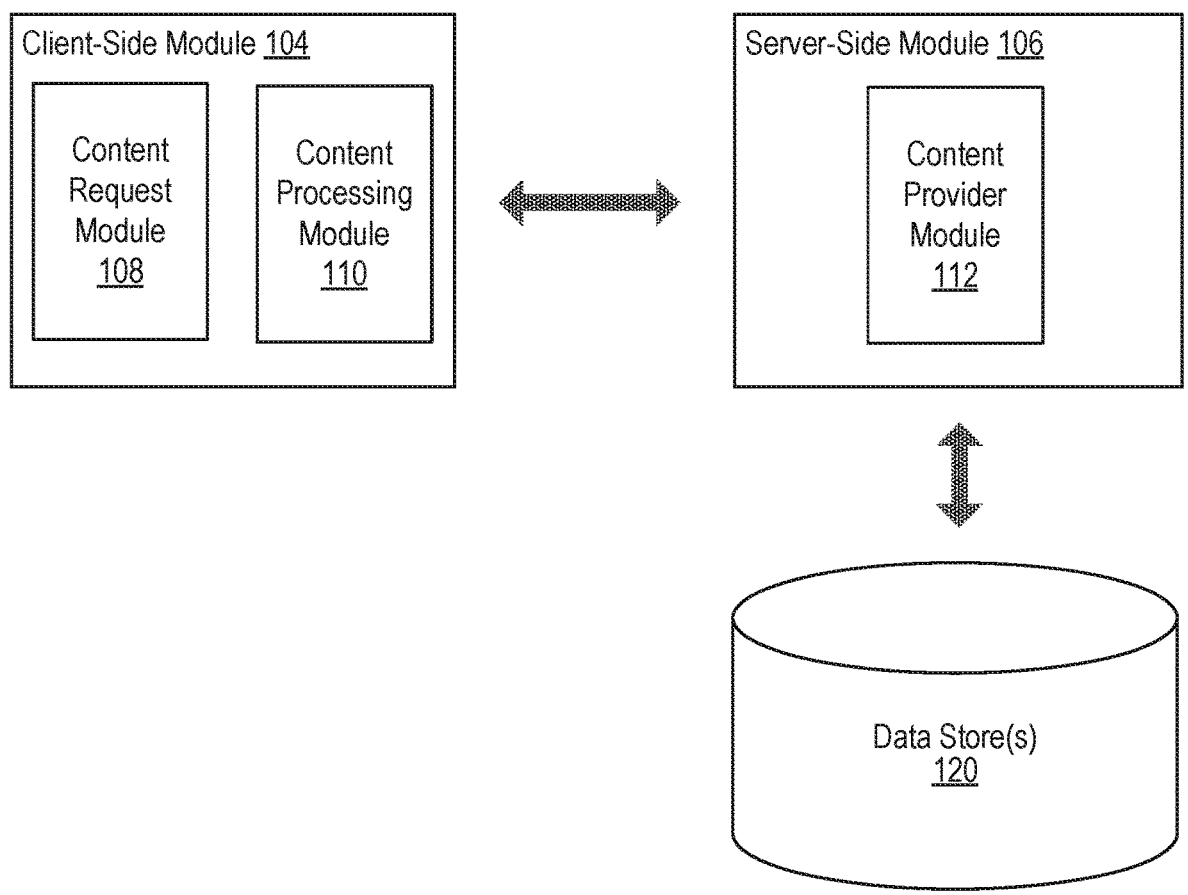
FIG. 1 illustrates an example data prioritization system, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Digital Media Delivery Prioritization

People often utilize computing devices (or systems) for a wide variety of purposes. Users can use their computing devices to, for example, interact with one another, access content, share content, and create content. In some cases, content items can include postings from members of a social networking system. The postings may include text and media content items, such as images, videos, and audio. The postings may be published to the social networking system for consumption by others.

When a user uses a client computing device (also referred to herein as a "client device") to receive content over a network, the client device can transmit requests for content to one or more content providers. For example, if a user of a client device would like to view a particular image or video posted to a social networking system, the client device may transmit a data request for the particular image or video to the social networking system (e.g., one or more servers associated with the social networking system). One or more servers can transmit the particular image or video to the client device in response to the data request.

At any given time, a client device may have numerous requests for data waiting to be fulfilled. For example, if a user is using a client device to data stream a video that has been posted to a social networking system, the client device may transmit multiple requests for different portions of the video. Furthermore, while one or more requests for the video are being fulfilled, the same client device may also transmit requests for other content items on the social networking system (e.g., images, other videos, or other content). This may be the case, for example, if the client device is attempting to prefetch one or more content items. In applications in which users may switch among numerous content items in a short period of time (e.g., applications that may involve scrolling by a user to select content), it may be an important feature from a user experience standpoint to prefetch one or more content items so that they can be loaded quickly if the user decides to switch to different content items. However, a client computing device has a finite amount of bandwidth to receive the data responsive to such requests. As such, when a large number of requests are pending, the client device may receive data responsive to the various requests simultaneously, and it may take a longer time to fulfill certain data requests. It may be the case that non-critical data requests (e.g., requests for pre-fetching content that can be presented to a user at a later time) may interfere with more critical, time-sensitive data requests. This can be particularly problematic for time-sensitive data requests, such as when a user is data streaming a video. If data for a video is delayed, presentation of the video may be interrupted, resulting in a sub-optimal user experience. Conventional approaches may not be effective in addressing these and other problems arising in computer technology.

Certain conventional approaches have attempted to address this problem by utilizing bandwidth estimation techniques on client devices. A client device can estimate the amount of bandwidth available, and can determine whether this estimated amount of bandwidth is sufficient to support prefetching of one or more off-screen content items. However, under such conventional approaches, client devices generally can only make estimates about available bandwidth based on past bandwidth information, and generally lack information about potential limiting factors on the server-side. Furthermore, throughput received by a client device can vary unpredictably over time. As such, under conventional approaches, client devices utilize inherently imperfect estimates of available bandwidth to decide whether or not they can transmit data requests for prefetching content. Due to this imperfect information, client devices may frequently request either too much data (potentially resulting in buffering or interrupted user experience) or too little data (resulting in inefficient utilization of available bandwidth and also a potentially negative user experience if a user navigates to another content item for which loading is delayed due to failure to pre-fetch sufficient content).

Conventional approaches are also generally ineffective at handling instances in which priority of data requests may change suddenly. This may occur, for example, if a user was viewing a first video, and one or more high priority data requests were transmitted for the first video, but the user suddenly switches to a second video. Once the user switches from the first video to the second video, the in-flight data requests for the first video are no longer a high priority, and any in-flight data requests for the second video, which were initially transmitted as lower priority pre-fetching requests, may suddenly become a high priority. Conventional approaches may not be effective in addressing these and other problems arising in computer technology.

An improved approach rooted in computer technology overcomes the foregoing and other disadvantages associated with conventional approaches specifically arising in the realm of computer technology. In one embodiment, rather than having client devices determine whether or not to prefetch content and issuing data requests based on those determinations, the presently disclosed technology contemplates that such determinations may be made on the server-side by one or more servers providing content to client devices. The presently disclosed technology takes advantage of the fact that servers transmitting data to client devices have much more accurate information about available downlink bandwidth due to the fact that a server knows the transport layer window size available to send data to a client device. In various embodiments of this server-side data prioritization approach, a client device can provide a server with one or more data requests pertaining to one or more content items. Each data request can include and/or be associated with priority information for data request. The server can then determine which data requests to fulfill at which times based on available bandwidth to the client device, and priority information for all pending data requests for the client device. For example, in one embodiment, once a server has a set of data requests and priority information, the server can choose to process the data requests sequentially in order of priority. This would ensure that downlink bandwidth is fully utilized while also ensuring that high priority data requests are never delayed or hindered by lower priority data requests. In various embodiments, the server can utilize its more precise knowledge about available bandwidth to more effectively and efficiently schedule data transmissions to the client device. More details relating to the disclosed technology are provided below.

In alternative embodiments, which may collectively be referred to herein as a client-side data prioritization approach, a client device can force prioritization by a server by delaying processing of received data associated with lower priority data requests. In certain embodiments, a client device may have multiple connections with a server (e.g., TCP sockets), with each connection being associated with a respective content item. In certain embodiments, a client device can force a server to prioritize data transmissions by selectively delaying processing of data received on one or more of the connections. For example, the client device can delay processing of data received on connections that are associated with lower priority content items (e.g., associated with off-screen content items being pre-fetched) while continuing to process data received on connections that are associated with high priority content items (e.g., an on-screen content item being presented to a user). Delayed processing on certain connections may cause a server to stop transmitting data to those connections (e.g., connections associated with lower priority content items), while continuing to transmit data to one or more other connections (e.g., connections associated with higher-priority content items) on which data processing is not delayed. In another example implementation, a client device can use signaling with a server to pause and resume data transfer as priorities change. For example, a client device can transmit pause and/or resume commands to one or more servers over various connections in order to selectively pause or resume data transmissions pertaining to particular content items. Many variations are possible. More details relating to the disclosed technology are provided below.

FIG. 1 illustrates an example data prioritization system 102, according to an embodiment of the present technology. As shown in the example of FIG. 1, the data prioritization system 102 can include a client-side module 104 and a server-side module 106. In some instances, the example server-side module 106 can communicate with at least one data store 120. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the data prioritization system 102 can be implemented in any suitable combinations.

In some embodiments, the data prioritization system 102, the client-side module 104, and/or the server-side module 106 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the data prioritization system 102, the client-side module 104, and/or the server-side module 106 can be, in part or in whole, implemented as software running on one or more computing devices or systems, such as on a server system or a client computing device. In some instances, the data prioritization system 102, the client-side module 104, and/or the server-side module 106 can be, in part or in whole, implemented within or configured to operate in conjunction with or be integrated with a social networking system (or service), such as a social networking system 630 of FIG. 6. Likewise, in some instances, the data prioritization system 102, the client-side module 104, and/or the server-side module 106 can be, in part or in whole, implemented within or configured to operate in conjunction with or be integrated with a client computing device, such as the user device 610 of FIG. 6. For example, the data prioritization system 102, the client-side module 104, and/or the server-side module 106 can be implemented as or within a dedicated application (e.g., app), a program, or an applet running on a user computing device or client computing system. The application incorporating or implementing instructions for performing functionality of the data prioritization system 102, the client-side module 104, and/or the server-side module 106 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

In various embodiments, the server-side module 106 can be configured to communicate and/or operate with the at least one data store 120. The data store 120 can be configured to store and maintain various types of data. In some implementations, the data store 120 can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some implementations, the data store 120 can store information to be utilized by the server-side module 106, such as content posted to a social networking system, and the like. Although not shown in FIG. 1, in certain embodiments, the client-side module 104 also can be associated with and communicate with one or more datastores.

As mentioned above, various embodiments of the presently disclosed technology may utilize a server-side data prioritization approach, while other embodiments may utilize a client-side data prioritization approach. Each approach will be described in greater detail herein, with the client-side module 104 and the server-side module 106, their various sub-modules, and their various functions first being described with reference to the server-side data prioritization approach, and then described with reference to the client-side data prioritization approach. Although the server-side data prioritization approach, and its various embodiments, are discussed separately from the client-data prioritization approach and its various embodiments, it should be understood that these approaches are not necessarily mutually exclusive, and various features described with respect to embodiments of the server-side data prioritization approach may be applied to embodiments of the client-side data prioritization approach, and vice versa.

As shown in the example of FIG. 1, the client-side module 104 can include a content request module 108 and a content processing module 110, and the server-side module 106 can include a content provider module 112.

Server-Side Data Prioritization Approach

In various embodiments of a server-side data prioritization approach, the content request module 108 can be configured to generate one or more data requests that are transmitted from a client device to a server. The one or more data requests may be associated with one or more content items being requested by the client device. In an embodiment, a client device and a server may be connected via a single connection, and the single connection may comprise one or more data streams. For example, the connection may be a TCP connection that is multiplexed into one or more data streams. In a more particular embodiment, the connection may be a TCP connection utilizing the HTTP/2 network protocol. In an embodiment, content items requested by the content request module 108 may come from multiple servers, but the client device may establish a connection with one server that acts as a logical endpoint that is tasked with communicating with the multiple servers to collect all data requested by the client device and transmitting it to the client device. This allows a single server to prioritize downlink traffic without forcing all of the data to be stored on the single server.

Each of the one or more data streams may be associated with a particular content item, such that data requests pertaining to a particular content item are transmitted using the respective data stream associated with the content item. Each data request generated by the content request module 108 may be associated with and/or comprise priority information, such as a priority value, indicative of an importance or priority level of the data request. For example, if a content item is on-screen (i.e., currently being presented to and/or viewed by a user), data requests pertaining to that content item may have a higher priority level than data requests pertaining to content items that are off-screen (i.e., are not currently being presented to the user). In certain embodiments, data requests may be assigned a priority value that is consistent with a priority value assigned to a data stream on which the data request is transmitted. As noted above, each data stream may be associated with a particular content item, and each connection may be associated with a respective content item of a set of content items, such that all data requests pertaining to a content item (and all data responsive to those data requests) are transmitted over the data stream associated with that content item. Each data stream may be associated with a priority value based on an importance or priority of the content item associated with the data stream, and all data requests transmitted over that data stream may be assigned the same priority value.

Each data request generated by the content request module 108 may identify a content item being requested. For example, the data request may identify a URL from which the content item can be retrieved. Each data request may also specify a portion of the content item being requested. For example, if a particular content item, such as a video, is very large, a particular data request may request only a portion of the video (e.g., a two-second portion of the video), rather than requesting the entire video. In an embodiment, a data request may identify a specific portion of a content item by identifying a range of bytes (e.g., bytes 19,999-25,000). In certain instances (e.g., for smaller files), the byte range may indicate that the entire content item is being requested.

In various embodiments, the content request module 108 can be configured to update priority information for data streams and/or data requests from time to time as appropriate. For example, if a user is viewing a first video, a data stream and/or data requests associated with the first video may be labeled as high priority, while a data stream and/or data requests associated with a second off-screen video may be labeled as low priority. If after scrolling the user suddenly switches from the first video to the second video, the content request module 108 can notify a server (e.g., the server-side module 106) that the first video is now low priority, and the second video is now high priority, and any data requests associated with the two videos should have priority information updated accordingly. The content request module 108 can also be configured to send instructions to a server (e.g., the server-side module 106) to cancel certain pending data requests. For example, if a previous data request requested bytes 1-10 of a first video, but the user skips a beginning portion of the first video and scrubs immediately to the middle of the video, the content request module 108 can generate a new request for the appropriate portion of the video the user wishes to see (e.g., for bytes 90-100 of the video), and can also generate an instruction to the server to cancel the previous data request for bytes 1-10.

In certain embodiments, there may be no limit to the number of data streams that may be included in a single connection between a client device and a server. In such embodiments, the content request module 108 can transmit data requests to a server (e.g., the server-side module 106 and/or the content provider module 112), and rely entirely on the server to decide the order in which data requests are serviced. This is because the server and the client device can have an unlimited number of data streams open for an unlimited number of content items, and the server can respond to any pending data request at any time based on priority information for the pending data requests, as will be discussed in greater detail below with reference to the content provider module 112.

However, in other embodiments, there may be a cap on the maximum number of data streams that may be active at a given time between a client device and a server. For example, there may be a maximum of six data streams that may be active at any one time between a client device and a server. In such instances, the content request module 108 may be tasked with determining which data streams to keep active, and which data streams to close as new data requests are generated.

Figure 2A:
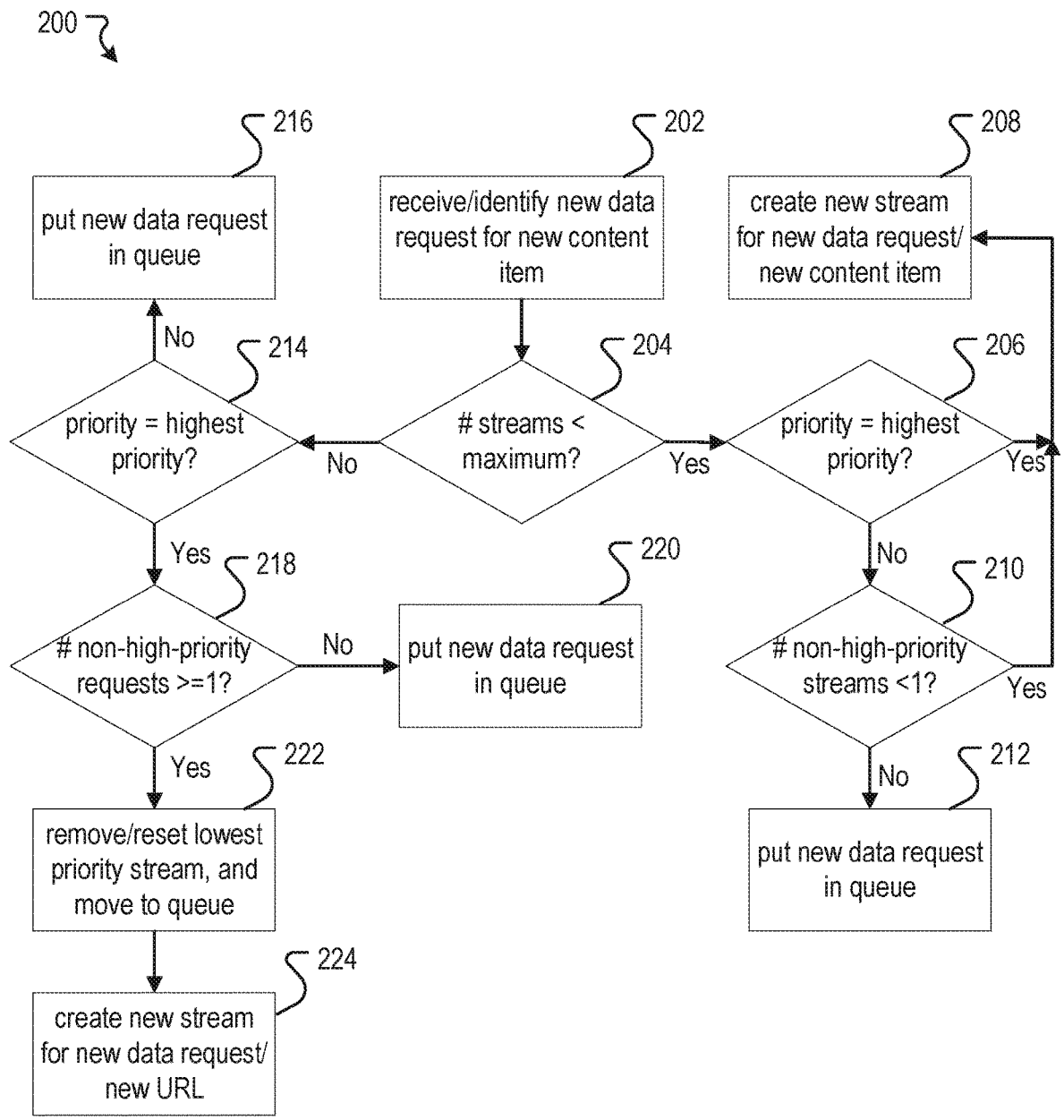
FIG. 2A illustrates an example flow chart associated with server-side data prioritization, according to an embodiment of the present technology.
Figure 2B:
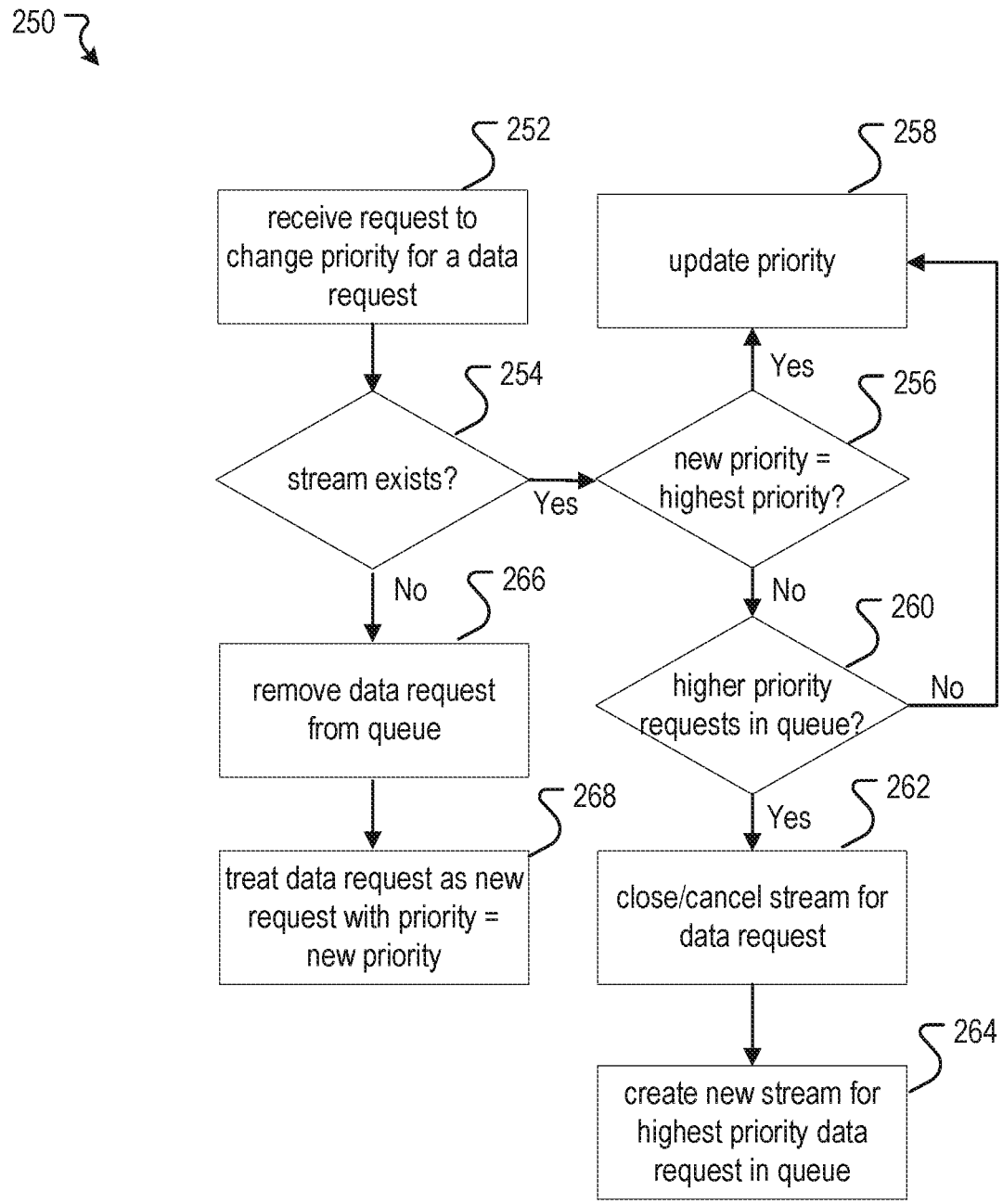
FIG. 2B illustrates an example flow chart associated with server-side data prioritization, according to an embodiment of the present technology.

FIGS. 2A and 2B illustrate two flow charts, 200, 250 that depict example implementations by which the content request module 108 can maintain a set of active data streams between a client device and a server. In FIG. 2A, the content request module 108 is modifying a set of active data streams based on a new data request requesting a portion of a content item for which an active data stream does not currently exist. At block 202, a new data request is identified which requests a portion of a new content item (i.e., a content item for which an active data stream does not currently exist). At block 204, the content request module 108 determines whether the number of data streams currently active is less than a maximum allowable number of data streams. If yes, at block 206, the content request module 108 determines whether the new data request has a highest priority level (e.g., has been identified as a high priority data request). If yes, a new data stream is created for the new data request (block 208). If no, the content request module 108 determines whether the number of active, non-high priority (e.g., low priority) data streams is less than 1 (block 210). Essentially, block 210 determines whether there is at least 1 low priority content item being pre-fetched. If there are zero low priority content items being pre-fetched, (i.e., the response to block 210 is "yes"), then a new data stream is created for the new data request (block 208). This is because it is generally desirable to have at least one content item that is being pre-fetched in order to maximize bandwidth utilization. However, if there is already at least one low priority content item being pre-fetched (i.e., the response to block 210 is "no"), then the new data request is placed in a queue so that the data request can be processed at a later time when more data streams are available (i.e., fewer data streams are active). Although block 210 determines whether there is at least one low priority content item being prefetched, the threshold number of low priority content items can be adjusted. For example, if it is determined that it is more desirable to be pre-fetching two content items rather than only pre-fetching one, then block 210 can be modified to determine whether the number of non-high priority data streams is less than 2.

Returning to block 204, if the number of active data streams is currently at a maximum allowable number of active streams (i.e., the response to block 204 is "no"), the content request module 108 determines whether the new data request has a highest priority level (block 214). If no, the new data request is placed into a queue for processing at a later time when more data streams are available (block 216). If yes, the content request module 108 determines whether the number of active, non-high priority (e.g., low priority) data streams is greater than or equal to 1. Essentially, block 218 determines whether there are any active streams devoted to lower priority content items (e.g., content items being prefetched). Since the new data request has a highest priority, it should replace any lower priority data requests. As such, if the answer to block 218 is yes, the lowest priority data stream is removed and moved into the queue (block 222), and a new data stream is created for the new data request (block 224). However, if the response to block 218 is "no," indicating that all active data streams are devoted to high priority data requests, then the new data request is placed into the queue (block 220) for processing at a later time when more data streams are available. The queue of pending data requests may be ordered based on priority level such that higher priority data requests are processed as soon as data streams become available.

In FIG. 2B, the content request module 108 is modifying a set of active data streams in response to a request to change priority for an already-existing (e.g., pending and/or in-flight) data request. At block 252, the content request module 108 identifies a request to change priority for an existing data request. At block 254, the content request module 108 determines whether an active data stream exists for the data request. If no, then the data request must be in a queue waiting to be processed. As such, at block 266, the data request is removed from the queue, and at block 268, the request to change the priority of the data request from a previous priority level to a new priority level is treated as a new data request that has a priority level equal to the new priority level. The new data request may be processed, for example, using the methodology outlined in FIG. 2A.

If an active data stream does exist for the data request (i.e., response to block 254 is "yes"), the content request module 108 determines whether the new priority level is equal to a highest priority level (block 256). For example, block 256 determines whether the data request is being changed from a low priority data request to a high priority data request. If yes, the priority level of the data request (and/or the active data stream for the data request) is changed to the new priority level (block 258). If no, the content request module 108 determines whether there are data requests in the queue that have a higher priority than the new priority level being assigned to the data request (block 260). For example, if the data request is being changed from high priority to low priority, block 260 determines whether there are any high priority data requests in the queue waiting for a data stream to free up. If there are no higher priority data requests in the queue (i.e., the response to block 260 is "no"), the data request is updated to the new priority level (block 258). However, if there are data requests in the queue with a higher priority level than the new priority level to which the data request is being changed, the data stream assigned to the data request is closed (block 262), the data request is placed in the queue with its updated priority level, and a new data stream is created for the highest priority data request in the queue (block 264).

Using the methodologies described/depicted in FIGS. 2A and 2B, the content request module 108 can maintain a set of active data streams that satisfies a threshold defining a maximum allowable number of active data streams.

Returning to FIG. 1, in various embodiments of a server-side data prioritization approach, the content provider module 112 can be configured to receive one or more data requests from a client device (e.g., from the content request module 108). As discussed above, each data request may identify a particular content item being requested, a portion of the content item being requested, and priority information for the data request. Using a server-side data prioritization approach, the content provider module 112 may be tasked with prioritizing data to be transmitted to the client device based on priority information for one or more pending data requests. A set of pending data requests can include one or more high priority data requests (e.g., data requests having a highest priority level), and one or more low priority data requests (e.g., data requests having a priority level lower than the highest priority level). In one embodiment, the content provider module 112 may process all high priority data requests before processing any low priority data requests. Low priority data requests may be processed during times when there are no high priority data requests waiting to be processed (e.g., all high priority data requests have already been processed). If a new high priority data request is received, processing of any low priority data requests can be paused, and the high priority data request can be processed. If, upon completion of the new high priority data request, there are no longer any high priority data requests pending, low priority data requests can then be processed once again.

Figure 3:
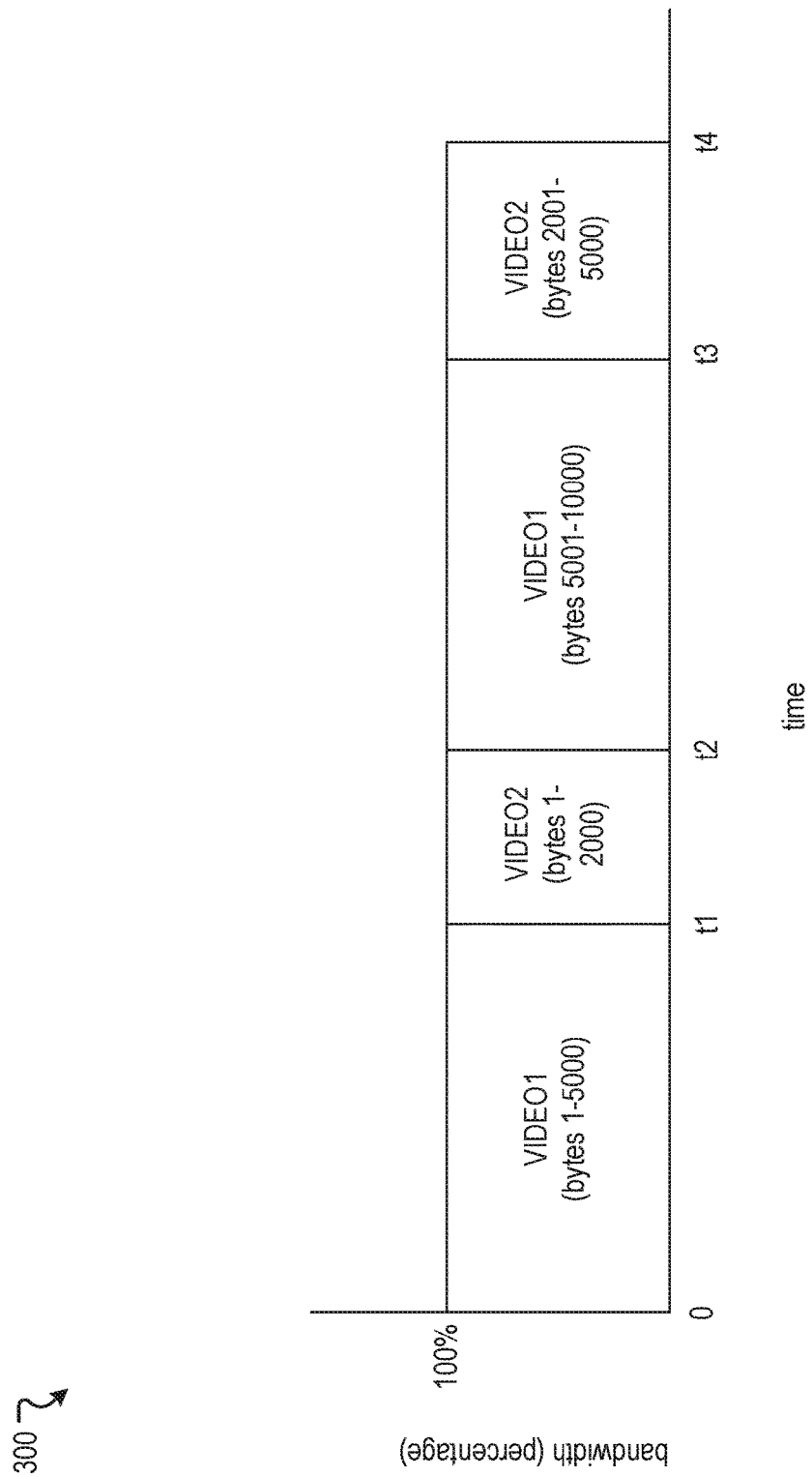
FIG. 3 illustrates an example scenario associated with server-side data prioritization, according to an embodiment of the present technology.

For example, consider an example scenario 300 depicted in FIG. 3. In the example scenario 300, a user is viewing a first video (Video1) on a client device. The first video may be a video within a content feed on a social networking system. The client device may also attempt to pre-fetch a second video that is positioned immediately after the first video in the content feed (Video2). As such, the client device may transmit to the content provider module 112 a first data request for a portion of the first video (e.g., Video1 (bytes 1-5000)), and a second data request for a portion of the second video (e.g., Video2 (bytes 0-5000)). The first data request may be identified as high priority, while the second data request is low priority. From time 0 to time t1, the content provider module 112 can utilize all available bandwidth between the client device and the server to transmit bytes 0-5000 of Video1 to the client device, in response to the first data request. Once the first data request is completely processed (i.e., all data responsive to the first data request is transmitted to the client device), there are no more high priority data requests pending. As such, the content provider module 112 can immediately begin processing the second data request. It is notable that, due to the immediate processing of second data request, the link is fully utilized while at the same time not starving the high priority data request at any point in time. Starting at time t1, the content provider module 112, responsive to the second data request, utilizes all available bandwidth to transmit the requested bytes of Video2 to the client device. However, at time t2 (when bytes 1-2000 of Video2 have been transmitted), before the content provider module 112 can transmit all 5000 requested bytes from Video2, the content provider module 112 receives a third data request for Video1 (bytes 5001-10,000). The third data request is identified as a high priority data request. This may occur because the user has viewed several seconds of the first video, and now needs data for the next few seconds of video. At time t2, processing of the second data request (a low priority data request) is paused, and the third data request (a high priority data request) is processed from time t2 to t3 until the third data request is fully processed. Once the third data request is fully processed, there are no longer any high priority data requests pending, and processing of low priority data requests can resume at t3. From time t3 to t4, the content provider module 112 transmits bytes 2001-5000 of Video2 to the client device to complete processing of the second data request. In an embodiment, if there are multiple pending data requests that have the same level of priority, they may be processed sequentially based on the order they were received. In another embodiment, if there are multiple pending data requests that have the same level of priority, they may be processed in parallel.

In certain embodiments, priority information for a data request may indicate a weight for the data request. For example, rather than assigning data requests a binary label such as high priority versus low priority, each data request may be assigned a weight indicative of an importance or priority of the data request. For example, a first data request may have a weight of 40, a second data request may have a weight of 7, and a third data request may have a weight of 3. Segments of time may be divided up between a set of pending data requests based on their weights. For example, a pre-determined round-robin time can be divided up between the set of pending data requests based on their weights. Consider an example scenario in which the round-robin time is set to one second. For the three data requests discussed above, the total weight is 50. The first data request may be assigned 40/50=80% of each round-robin time, the second data request may be assigned 7/50=14% of each round-robin time, and the third data request may be assigned 3/50=6% of each round-robin time. For each one-second interval, 80% of the time can be devoted to processing the first data request, 14% of the time can be devoted to processing the second data request, and 6% of the time can be devoted to processing the third data request.

Returning to FIG. 1, in various embodiments of a server-side data prioritization approach, the content processing module 110 can be configured to receive data from a server (e.g., the server-side module 106 and/or the content provider module 112) responsive to data requests transmitted from a client device to the server. The content processing module 110 can provide a user with content based on the data received. For example, the content processing module 110 can present the user with content items in a user interface displayed on the client device.

Client-Side Data Prioritization Approach

The embodiments described above generally pertain to a server-side data prioritization approach in which a server is tasked with prioritizing data requests and responding to data requests accordingly. In contrast, the various embodiments associated with a client-side data prioritization approach allow for a client device to force a server to prioritize certain data requests by delaying processing of received data. Each of the content request module 108, the content processing module 110, and the content provider module 112 will now be described with respect to their roles and functions according to various embodiments of a client-side data prioritization approach. However, it should be understood that the server-side data prioritization approach and its respective embodiments, and the client-side data prioritization approach and its respective embodiments are not mutually exclusive, and various features and/or functions of the content request module 108, the content processing module 110, and/or the content provider module 112 described above with respect to the server-side data prioritization approach can be applied to the same modules in the client-side data prioritization approach, and vice versa.

In various embodiments of a client-side data prioritization approach, the content request module 108 can be configured to generate one or more data requests that are transmitted from a client device to a server. The one or more data requests may be associated with one or more content items being requested by the client device. In an embodiment, a client device and a server may be connected via one or more connections, with each connection being associated with a particular content item, such that data requests pertaining to a particular content item are transmitted using the connection associated with the content item. For example, each connection may be a TCP connection that is established between the client device and the server using the HTTP/1.1 network protocol. As discussed above, the server-side data prioritization approach may utilize a single connection between a client device and a server that is multiplexed into multiple data streams to accommodate data requests for multiple content items. However, certain network protocols may not allow for multiplexing of a single connection. For example, the HTTP/1.1 network protocol generally requires an individual TCP connection to be established between a client device and a server for each content item being requested by the client device. As such, if a client device is requesting three different content items from a server, the client device may establish three separate TCP connections with the server, with each connection being associated with a respective one of the three content items.

Each data request generated by the content request module 108 may be associated with priority information, such as a priority value, indicative of an importance or priority level of the data request. For example, if a content item is on-screen (i.e., currently being presented to a user), data requests pertaining to that content item may have a higher priority level than data requests pertaining to content items that are off-screen (i.e., are not currently being presented to the user). In certain embodiments, data requests may be assigned a priority value based on a priority value assigned to a content item with which the data request is associated. In certain embodiments, priority information may not be transmitted from a client device to a server. This is because, in the client-side data prioritization approach, the client device (e.g., the content request module 108 and/or the content processing module 110) is tasked with prioritization of data rather than the server, and the server may respond to data requests without regard for any priority information, as will be demonstrated in greater detail herein.

Each data request generated by the content request module 108 may identify a content item being requested. For example, the data request may identify a URL from which the content item can be retrieved. Each data request may also specify a portion of the content item being requested. For example, if a particular content item, such as a video, is very large, a particular data request may request only a portion of the video (e.g., a two-second portion of the video), rather than requesting the entire video. In an embodiment, a data request may identify a specific portion of a content item by identifying a range of bytes (e.g., bytes 19,999-25,000). In certain instances (e.g., for smaller files), the byte range may indicate that the entire content item is being requested.

In various embodiments of a client-side data prioritization approach, the content processing module 110 can be configured to receive data from a server (e.g., the server-side module 106 and/or the content provider module 112) responsive to data requests transmitted from a client device to the server. The content processing module 110 can provide a user with content based on the received data. For example, the content processing module 110 can present the user with content items in a user interface displayed on the client device.

As will be described in greater detail below, a server (e.g., the server-side module 106 and/or the content provider module 112) may receive the one or more data requests generated by the content request module 108, and may provide a client device with data responsive to the one or more data requests. In certain instances, the server may provide data responsive to different data requests pertaining to different content items simultaneously over the various connections established between the client device and the server. As such, bandwidth between the client device and the server may be divided between the various data requests and connections.

In various embodiments, the content processing module 110 can force prioritization of certain data requests pertaining to certain content items by delaying processing of data received from the server. As mentioned above, a client device may be connected to a server via multiple connections (e.g., multiple TCP connections), with each connection being associated with a particular content item. If the content processing module 110 would like to force the server to de-prioritize data requests pertaining to a first content item, the content processing module 110 can delay and/or pause processing of data received over the connection associated with the first content item. For example, if the connection is a TCP connection, each TCP connection maintains flow control information. This flow control information for a TCP connection is indicative of how much data was transmitted to a client device on that TCP connection, but has not yet been processed by the client device. If the flow control information indicates that the amount of unprocessed information received by the client device over the TCP connection exceeds a threshold level, the server will stop transmitting data over the TCP connection until the client device has processed some of the data it has already received. By selectively delaying processing of data received on certain connections, the content processing module 110 can force a server to stop transmitting data pertaining to certain data requests and/or content items. Similarly, if the content processing module 110 would like a server to prioritize data requests pertaining to a particular content item (e.g., a high priority content item), and the content item is associated with a first connection between a client device and the server, the content processing module 110 can delay and/or pause processing of data received on all other connections other than the first connection. This will cause data transmission to be paused on all other connections, and available bandwidth can be devoted entirely to the first connection associated with the high priority content item. In yet another example, if priority information changes for one or more content items, the content processing module 110 can selectively delay or resume processing of data based on those changing priorities. For example, if a first content item is initially marked as a high priority content item, and a second content item is initially marked as a low priority content item, the content processing module 110 may process data received on a first connection associated with the first content item and delay processing of data received on a second connection associated with the second content item. However, at a later time, the second content item may become a high priority content item, and the first content item may become a low priority content item (e.g., if a user stops viewing the first content item and begins viewing the second content item). Based on this change in priority information, the content processing module 110 can pause and/or delay processing of data on the first connection, and resume processing of data on the second connection. Many variations are possible.

In certain embodiments, delaying and/or pausing processing of data on a connection may occur based on a determination that one or more criteria are satisfied. For example, processing of information on one or more low priority connections (e.g., connections associated with low priority content items) may occur in response to a determination that a high priority content item is at risk of missing a deadline, or a determination that there is insufficient bandwidth to sufficiently meet the needs of a high priority content item. In certain embodiments, the content processing module 110 and/or the content request module 108 can use signaling with a server to pause and resume data transfer as priorities change. For example, a client device (e.g., the content processing module 110 and/or the content request module 108) can transmit pause and/or resume commands to one or more servers over various connections in order to selectively pause or resume data transmissions pertaining to particular content items.

In various embodiments of a client-side data prioritization approach, the content provider module 112 can be configured to receive one or more data requests from a client device (e.g., from the content request module 108). As discussed above, each data request may identify a particular content item being requested and a portion of the content item being requested. As also described above, a client device and a server may be connected via one or more connections, with each connection being associated with a particular content item. Data responsive to data requests pertaining to a particular content item can be transmitted to a client device using the appropriate connection that is associated with that content item. In an embodiment, the content provider module 112 may service data requests from a client device pertaining to multiple content items over multiple connections simultaneously, and with no regard for priority. However, if flow control information on a particular connection indicates that a client device has a threshold amount of data that has been received by the client device over the connection but has not yet been processed by the client device, the content provider module 112 can pause transmission of data over that connection until the amount of unprocessed data on that connection falls below the threshold. Once the amount of unprocessed data on a connection falls below the threshold, the content provider module 112 can resume transmitting data over the connection.

FIG. 4 illustrates an example method 400, according to an embodiment of the present technology. It should be appreciated that there can be additional, fewer, or alternative steps performed in similar or alternative orders, or in parallel, within the scope of the various embodiments discussed herein unless otherwise stated.

At block 402, the example method 400 can receive a plurality of data requests transmitted by a client device, wherein each data request is associated with priority information indicative of a priority level of the data request. At block 404, the example method 400 can identify a first data request of the plurality of data requests as a high priority data request based on priority information associated with the first data request and a second data request of the plurality of data requests as a low priority data request based on priority information associated with the second data request. At block 406, the example method 400 can process the first data request before processing the second data request based on identifying the first data request as a high priority data request and identifying the second data request as a low priority data request.

FIG. 5 illustrates an example method 500, according to an embodiment of the present technology. It should be appreciated that there can be additional, fewer, or alternative steps performed in similar or alternative orders, or in parallel, within the scope of the various embodiments discussed herein unless otherwise stated.

At block 502, the example method 500 can establish a plurality of connections to a server, wherein each connection is associated with a respective content item of a plurality of content items. At block 504, the example method 500 can transmit a plurality of data requests to the server using the plurality of connections, wherein each data request is associated with one content item of the plurality of content items. At block 506, the example method 500 can delay processing of data received on a first connection of the plurality of connections, the first connection being associated with a first data request of the plurality of data requests and a first content item of the plurality of content items, in order to cause the server to pause data transmissions responsive to the first data request.

It is contemplated that there can be many other uses, applications, and/or variations associated with the various embodiments of the present technology. For example, in some cases, users can choose whether or not to opt-in to utilize the disclosed technology. The disclosed technology can also ensure that various privacy settings and preferences are maintained and can prevent private information from being divulged. In another example, various embodiments of the present technology can learn, improve, and/or be refined over time.

Social Networking System—Example Implementation

Figure 6:
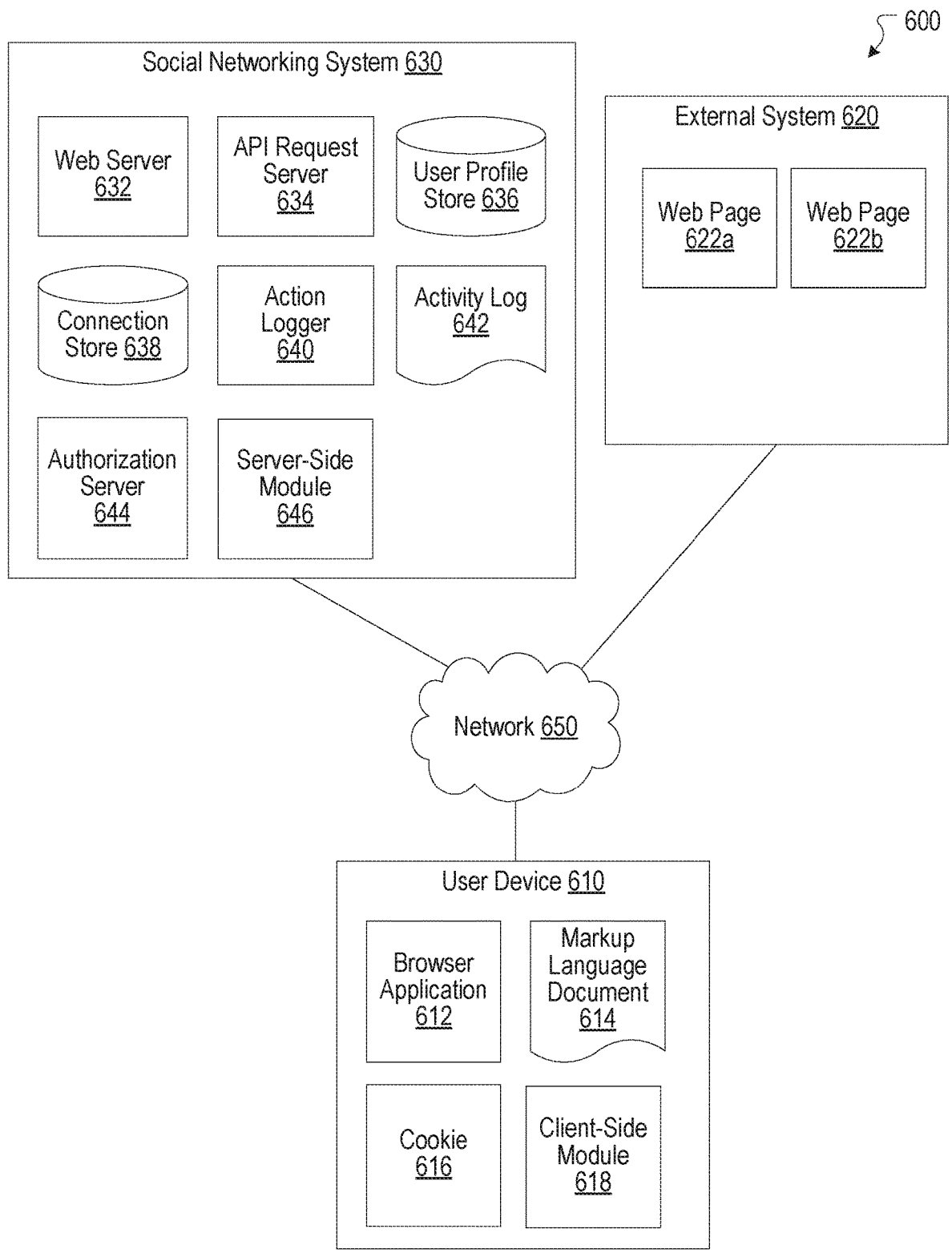
FIG. 6 illustrates a network diagram of an example system including an example social networking system that can be utilized in various scenarios, according to an embodiment of the present technology.

FIG. 6 illustrates a network diagram of an example system 600 that can be utilized in various scenarios, according to an embodiment of the present technology. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a server-side module 646. The server-side module 646 can, for example, be implemented as the server-side module 106, as discussed in more detail herein. In some embodiments, the user device 610 can include a client-side module 618. The client-side module 618 can, for example, be implemented as the client-side module 104, as discussed in more detail herein. As discussed previously, it should be appreciated that there can be many variations or other possibilities.

Hardware Implementation

Figure 7:
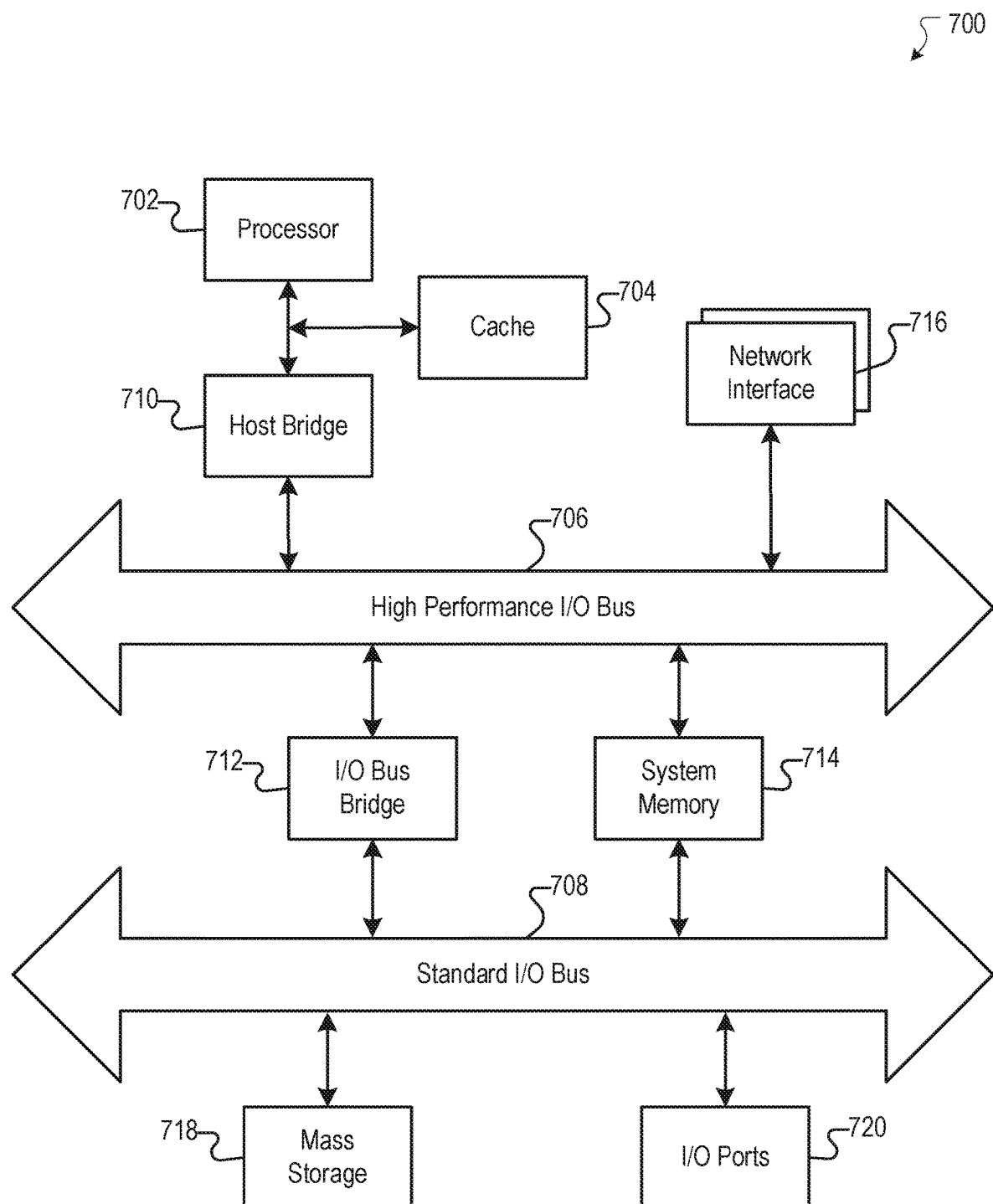
FIG. 7 illustrates an example of a computer system or computing device that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   establishing, by a computing system, a plurality of connections to a server, wherein each connection is associated with a respective content item of a plurality of content items;
   transmitting, by the computing system, a plurality of data requests to the server using the plurality of connections, wherein each data request is associated with one content item of the plurality of content items;
   receiving, by the computing system, data responsive to a first data request of the plurality of data requests from the server over a first connection of the plurality of connections, the first connection associated with a first content item of the plurality of content items;
   selectively pausing, by the computing system, processing of the data so that an amount of the data received by the computing system over the first connection in response to the first data request and not processed by the computing system exceeds a threshold level,
      wherein the amount of the data received is monitorable by the server based on flow control information associated with the first connection and data transmissions by the server responsive to the first data request are paused based on the selectively pausing; and
   processing, by the computing system, a portion of the amount of the data that the computing system already received but selectively paused processing so that an amount of unprocessed data of the amount of the data falls below the threshold level,
      wherein the data transmissions by the server responsive to the first data request are resumed based on the processing.

2. The computer-implemented method of claim 1, further comprising maintaining processing of data received over a second connection of the plurality of connections, the second connection being associated with a second data request of the plurality of data requests and a second content item of the plurality of content items, in order to cause the server to continue data transmissions responsive to the second data request.

3. The computer-implemented method of claim 2, wherein the first content item is identified as a low priority content item and the second content item is identified as a high priority content item.

4. The computer-implemented method of claim 3, wherein the second content item is an on-screen content item being presented to a user.

5. The computer-implemented method of claim 4, wherein the first content item is an off-screen content item being prefetched.

6. The computer-implemented method of claim 2, further comprising selectively pausing processing of data received over all connections of the plurality of connections except for the second connection in order to cause the server to pause data transmissions on all connections except for the second connection, and to expedite data transmissions associated with the second content item.

7. The computer-implemented method of claim 1, further comprising selectively pausing processing of data received over a subset of the plurality of connections in order to cause the server to pause data transmissions pertaining to prefetching of content items.

8. The computer-implemented method of claim 1, further comprising resuming the processing of the data received over the first connection in order to cause the server to resume the data transmissions responsive to the first data request.

9. The computer-implemented method of claim 1, further comprising receiving a plurality of data transmissions responsive to the plurality of data requests via the plurality of connections.

10. The computer-implemented method of claim 9, further comprising presenting content to a user based on the plurality of data transmissions responsive to the plurality of data requests.

11. A system comprising:
   at least one processor; and
   a memory storing instructions that, when executed by the at least one processor, cause the system to perform a method comprising:
      establishing a plurality of connections to a server, wherein each connection is associated with a respective content item of a plurality of content items;
      transmitting a plurality of data requests to the server using the plurality of connections, wherein each data request is associated with one content item of the plurality of content items;
      receiving data responsive to a first data request of the plurality of data requests from the server over a first connection of the plurality of connections, the first connection associated with a first content item of the plurality of content items;
      selectively pausing processing of the data so that an amount of the data received by the system over the first connection in response to the first data request and not processed by the system exceeds a threshold level,
         wherein the amount of the data received is monitorable by the server based on flow control information associated with the first connection and data transmissions by the server responsive to the first data request are paused based on the selectively pausing; and
      processing a portion of the amount of the amount of the data that the system already received but selectively paused processing so that an amount of unprocessed data of the amount of the data falls below the threshold level,
         wherein the data transmissions by the server responsive to the first data request are resumed based on the processing.

12. The system of claim 11, wherein the instructions, when executed by the at least one processor, further cause the system to perform: maintaining processing of data received over a second connection of the plurality of connections, the second connection being associated with a second data request of the plurality of data requests and a second content item of the plurality of content items, in order to cause the server to continue data transmissions responsive to the second data request.

13. The system of claim 12, wherein the first content item is identified as a low priority content item and the second content item is identified as a high priority content item.

14. The system of claim 13, wherein the second content item is an on-screen content item being presented to a user.

15. The system of claim 14, wherein the first content item is an off-screen content item being prefetched.

16. A non-transitory computer-readable storage medium including instructions that, when executed by at least one processor of a computing system, cause the computing system to perform a method comprising:
   establishing a plurality of connections to a server, wherein each connection is associated with a respective content item of a plurality of content items;
   transmitting a plurality of data requests to the server using the plurality of connections, wherein each data request is associated with one content item of the plurality of content items;
   receiving data responsive to a first data request of the plurality of data requests from the server over a first connection of the plurality of connections, the first connection associated with a first content item of the plurality of content items;
   selectively pausing processing of the data so that an amount of the data received by the computing system over the first connection in response to the first data request and not processed by the computing system exceeds a threshold level,
      wherein the amount of the data received is monitorable by the server based on flow control information associated with the first connection and data transmissions by the server responsive to the first data request are paused based on the selectively pausing; and
   processing a portion of the amount of the data that the computing system already received but selectively paused processing so that an amount of unprocessed data of the amount of the data falls below the threshold level,
      wherein the data transmissions by the server responsive to the first data request are resumed based on the processing.

17. The non-transitory computer-readable storage medium of claim 16, wherein the instructions, when executed by the at least one processor, further cause the computing system to perform: maintaining processing of data received over a second connection of the plurality of connections, the second connection being associated with a second data request of the plurality of data requests and a second content item of the plurality of content items, in order to cause the server to continue data transmissions responsive to the second data request.

18. The non-transitory computer-readable storage medium of claim 17, wherein the first content item is identified as a low priority content item and the second content item is identified as a high priority content item.

19. The non-transitory computer-readable storage medium of claim 18, wherein the second content item is an on-screen content item being presented to a user.

20. The non-transitory computer-readable storage medium of claim 19, wherein the first content item is an off-screen content item being prefetched.

\* \* \* \* \*